US012572269B2

(12) United States Patent
He

(10) Patent No.: US 12,572,269 B2
(45) Date of Patent: Mar. 10, 2026

(54) PERFORMING A CONTROL OPERATION BASED ON MULTIPLE TOUCH POINTS

(71) Applicant: Tencent Technology (Shenzhen) Company Limited, Guangdong (CN)

(72) Inventor: Fang He, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 11 days.

(21) Appl. No.: 18/215,211

(22) Filed: Jun. 28, 2023

(65) Prior Publication Data

US 2023/0342021 A1 Oct. 26, 2023

Related U.S. Application Data

(63) Continuation of application No. PCT/CN2022/134889, filed on Nov. 29, 2022.

(30) Foreign Application Priority Data

Mar. 1, 2022 (CN) .......................... 202210199987.9

(51) Int. Cl.
G06F 3/0488 (2022.01)
A63F 13/537 (2014.01)
G06F 3/0482 (2013.01)

(52) U.S. Cl.
CPC .......... *G06F 3/0488* (2013.01); *A63F 13/537* (2014.09); *G06F 3/0482* (2013.01); *G06F 2203/04808* (2013.01)

(58) Field of Classification Search
CPC ..... G06F 3/0482; G06F 3/0488; A63F 13/537
See application file for complete search history.

(56) References Cited

U.S. PATENT DOCUMENTS 10,331,259 B2 * 6/2019 Hotelling .............. G06F 3/0446
2012/0105481 A1 * 5/2012 Baek .................... G06F 3/04886
345/173

(Continued)

FOREIGN PATENT DOCUMENTS

CN 107562263 A 1/2018
CN 111672113 A 9/2020

(Continued)

OTHER PUBLICATIONS

International Search Report and Written Opinion received for PCT Patent Application No. PCT/CN2022/134889, mailed on Feb. 14, 2023, 13 pages. (6 pages of English translation and 7 pages of Original Document).

(Continued)

*Primary Examiner* — Seth A Silverman
(74) *Attorney, Agent, or Firm* — ArentFox Schiff LLP

(57) ABSTRACT

A method for performing a control operation includes acquiring touch operation information of at least two touch points of a touch event, the touch operation information comprising respective locations of the at least two touch points, and, in response to a determination that at least two of the locations are matched with respective locations of one or more object controls in a display interface, determining respective response priority labels corresponding to each of the one or more object controls. The method further includes, according to the respective response priority labels, selecting a target control from among the one or more object controls, and performing a target control operation indicated by the target control.

20 Claims, 9 Drawing Sheets

(56)            References Cited

U.S. PATENT DOCUMENTS

| | | | |
|---|---|---|---|
| 2015/0067528 A1* | 3/2015 | Yoshida | G08C 17/02 |
| | | | 715/740 |
| 2015/0338974 A1* | 11/2015 | Stone | G06F 3/0481 |
| | | | 345/173 |
| 2016/0291862 A1* | 10/2016 | Yaron | B60K 35/10 |
| 2021/0181894 A1* | 6/2021 | Hotelling | G06F 3/0414 |
| 2021/0291053 A1 | 9/2021 | Yang et al. | |

FOREIGN PATENT DOCUMENTS

| | | |
|---|---|---|
| CN | 112817483 A | 5/2021 |
| JP | 2015-066291 A | 4/2015 |

OTHER PUBLICATIONS

Office Action received for Japanese Patent Application No. 2024-531239, mailed on Feb. 4, 2025, 17 pages (10 pages of English Translation and 7 pages of Original Document).

Office Action received for Japanese Patent Application No. 2024-531239, mailed on Jun. 3, 2025, 15 pages (9 pages of English Translation and 6 pages of Original Document).

Office Action received for Chinese Patent Application No. 202210199987.9, mailed on Jan. 28, 2026, 20 pages (10 pages of English Translation and 10 pages of Original Document).

\* cited by examiner

Acquire a touch event, where the touch event carries touch operation information of at least two touch points, and the touch operation information includes respective operation positions of at least two touch points ⟶ S202

Determine, in a case that the operation locations are matched with a control location of at least one object control in a display interface, a response priority label corresponding to the at least one object control ⟶ S204

According to the response priority label, determine a target control from the at least one object control, and perform a target control operation indicated by the target control ⟶ S206

FIG. 2

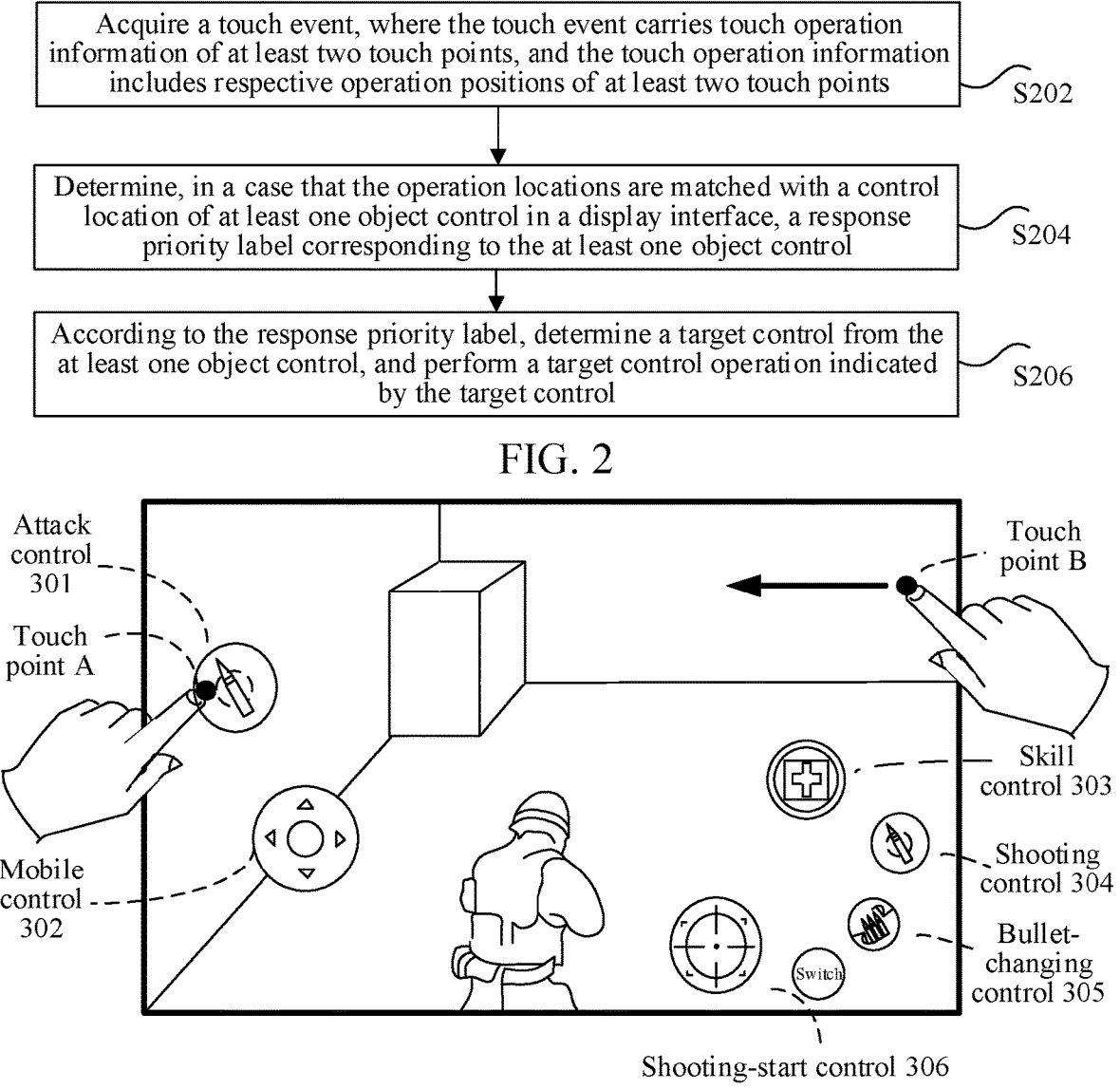

FIG. 3

Attack control 301

Mobile control 302

Skill control 303

Shooting control 304

Bullet-changing control 305

Shooting-start control 306

Attack control 301

Mobile control 302

Touch point C

Touch point B

Shooting control 304

Bullet-changing control 305

Shooting-start control 306

Attack
control
301

Mobile
control
302

Shooting
control 304

Bullet-
changing
control 305

Shooting-start control 306

Attack
control
301

Touch
point I

Shooting
control
304

Touch
point J

Shooting-start
control 306

Attack control 301

Mobile control 302

Touch point H

Touch point G

Touch point F

Shooting control 304

Bullet-changing control 305

Shooting-start control 306

IE_Pressed

Acquire a current finger index

Acquire screen location information

Determine a control corresponding to the screen location information

Acquire a priority label matched with the control

Process data

Save

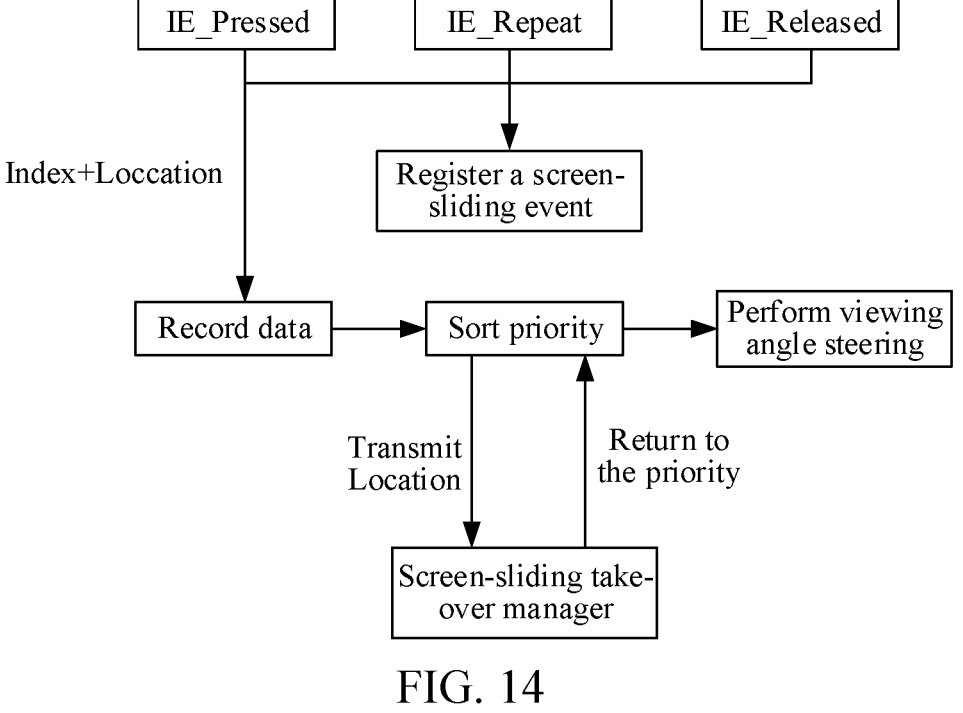

FIG. 14

Display a display interface, where the display interface includes an object control for responding a touch event, and the object control is arranged at a control location in the display interface                    S1502

In a case that at least two touch points in the display interface trigger a touch event and respective operation locations of the at least two touch points are matched with the control location of at least one object control in the display interface, perform a target control operation that is indicated by a target control and belongs to a target type, where the touch event is used for perform the target type of control operation, and the target control is a control, meeting a response priority condition, of the at least one object control                    S1504

FIG. 15

PERFORMING A CONTROL OPERATION BASED ON MULTIPLE TOUCH POINTS

RELATED APPLICATIONS

This application is a continuation of International Application No. PCT/CN2022/134889, filed on Nov. 29, 2022, which claims priority to Chinese Patent Application No. 202210199987.9, entitled "METHOD AND APPARATUS FOR PERFORMING CONTROL OPERATION, STOR-AGE MEDIUM, AND ELECTRONIC DEVICE" filed on Mar. 1, 2022. The entire disclosures of the prior applications are hereby incorporated by reference in their entirety.

FIELD OF THE TECHNOLOGY

The present disclosure relates to the field of computers, including a method and an apparatus for managing a control operation, a storage medium, and an electronic device.

BACKGROUND OF THE DISCLOSURE

Nowadays, in many three-dimensional simulation game applications, a virtual character controlled in a virtual game scene is controlled generally by a control that is configured on a display interface and has different control functions, so that the virtual character can complete a virtual game task set in the virtual game scene.

In the actual application process, the touch operation on each control on the display interface is often a multi-point touch operation, that is, it is often detected that many fingers touch a screen of a smart phone at the same time. For example, taking a steering control for adjusting an orientation of the controlled virtual character as an example, the steering control is configured to adjust the orientation of the controlled virtual character to a target orientation according to the target orientation selected by a touch adjusting operation on the control. However, in a case that the multi-point touch operation is detected on the steering control, a steering speed will be superposed or counteracted, that is: (1) in a case that a plurality of fingers slide in different directions, the orientation adjustment of the controlled virtual character will conflict and fail; and (2) in a case that a plurality of fingers slide in the same direction, the orientation adjustment of the controlled virtual character will be excessively rapid.

That is, for the current multi-point triggered control operation, an unintended control operation is easy to trigger, resulting in a response result that the real requirement of users cannot be met. In other words, the multi-point triggered control operation in a related art will make users have to try many times to trigger the control operation that is really intended to be selected, resulting in the problems of complex control operation process and low response efficiency.

SUMMARY

According to various embodiments provided in this disclosure, a method and an apparatus for performing a control operation, a storage medium, and a computer device are provided.

In an embodiment, a method for performing a control operation includes acquiring touch operation information of at least two touch points of a touch event, the touch operation information comprising respective locations of the at least two touch points, and, in response to a determination that at least two of the locations are matched with respective locations of one or more object controls in a display interface, determining respective response priority labels corresponding to each of the one or more object controls. The method further includes, according to the respective response priority labels, selecting a target control from among the one or more object controls, and performing a target control operation indicated by the target control.

In an embodiment, a method for performing a control operation includes displaying a display interface comprising two or more object controls responsive to touch input, each object control being arranged at a corresponding control location in the display interface. The method also includes, in response to a determination that at least two touch points in the display interface trigger a touch event and respective locations of the at least two touch points are matched with a control location of one or more object controls in the display interface, performing a target control operation that is indicated by a target control corresponding to one of the one or more object controls matched to the locations of the touch points. The target control being one of the one or more object controls matched to the locations of the touch points that meets a response priority condition.

In an embodiment, an apparatus for performing a control operation includes processing circuitry configured to acquire touch operation information of at least two touch points of a touch event, the touch operation information comprising respective locations of the at least two touch points, and, in response to a determination that at least two of the locations are matched with respective locations of one or more object controls in a display interface, determine respective response priority labels corresponding to each of the one or more object controls. The processing circuitry is further configured to, according to the respective response priority labels, select a target control from among the one or more object controls, and perform a target control operation indicated by the target control.

In an embodiment, a non-transitory computer-readable storage medium stores computer-readable instructions which, when executed by a computer device, cause the computer device to perform a method that includes acquiring touch operation information of at least two touch points of a touch event, the touch operation information comprising respective locations of the at least two touch points, and, in response to a determination that at least two of the locations are matched with respective locations of one or more object controls in a display interface, determining respective response priority labels corresponding to each of the one or more object controls. The method further includes, according to the respective response priority labels, selecting a target control from among the one or more object controls, and performing a target control operation indicated by the target control.

In an embodiment, a non-transitory computer-readable storage medium stores computer-readable instructions which, when executed by a computer device, cause the computer device to perform a method that includes displaying a display interface comprising two or more object controls responsive to touch input, each object control being arranged at a corresponding control location in the display interface. The method also includes, in response to a determination that at least two touch points in the display interface trigger a touch event and respective locations of the at least two touch points are matched with a control location of one or more object controls in the display interface, performing a target control operation that is indicated by a target control corresponding to one of the one or more object controls matched to the locations of the touch points. The target control being one of the one or more object controls matched to the locations of the touch points that meets a response priority condition.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To describe the technical solutions in the embodiments of this disclosure, the following briefly introduces the accompanying drawings for describing the embodiments. The accompanying drawings in the following description show merely some embodiments of this disclosure, and a person of ordinary skill in the art may still derive other drawings from the accompanying drawings. In the drawings:

FIG. 2 is a flowchart of a method for performing a control operation according to an embodiment of the present disclosure;

FIG. 3 is a schematic diagram of a method for performing a control operation according to an embodiment of the present disclosure;

FIG. 14 is a flowchart of still another method for performing a control operation according to an embodiment of the present disclosure;

FIG. 15 is a flowchart of still another method for performing a control operation according to an embodiment of the present disclosure;

DESCRIPTION OF EMBODIMENTS

To make a person skilled in the art understand the solutions in the present disclosure better, the following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure fall within the protection scope of the present disclosure.

In the specification, claims, and the foregoing accompanying drawings of the present disclosure, the terms "first", "second", and so on are intended to distinguish between similar objects rather than indicating a specific order. It is to be understood that data used in this way is exchangeable in a proper case, so that the embodiments of the present disclosure described herein can be implemented in an order different from the order shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It may be understood that in the specific implementation of this disclosure, related data such as operation information and a control operation is involved, and when the above embodiments of this disclosure are applied to specific products or technologies, authorization and permission or consent of the user is required, and the connection, use and processing of the related data need to comply with relevant laws, regulations and standards of relevant countries and regions.

Figure 1:
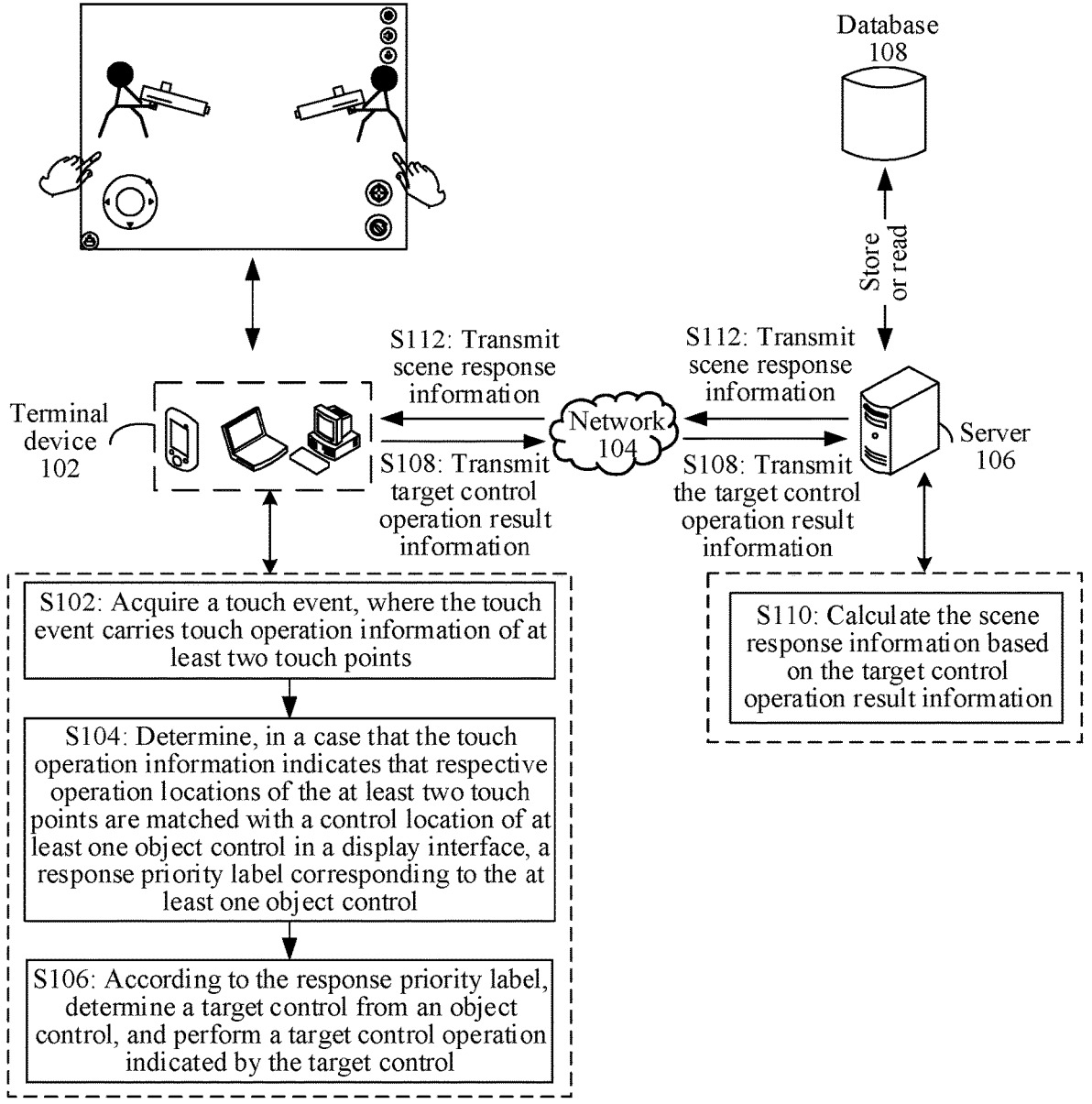
FIG. 1 is a schematic diagram of a hardware environment of a method for performing a control operation according to an embodiment of the present disclosure.

According to one aspect of the embodiments of the present disclosure, a method for performing a control operation is provided. In an implementation, the method for performing the control operation may be applied to, but not limited to, a system for performing a control operation in a hardware environment shown in FIG. 1, where the system for performing the control operation may include but is not limited to a terminal device 102, a network 104, a server 106 and a database 108. A target client (as shown in FIG. 1, taking the case where the target client is a shooting game application client as an example) runs in the terminal device 102. The terminal device 102 includes a human-computer interaction screen, a processor and a memory. The human-computer interaction screen is configured to display a virtual game scene (a virtual shooting game scene shown in FIG. 1), and is further configured to provide a human-computer interaction interface to receive a human-computer interaction operation for controlling a controlled virtual object in a virtual scene. The virtual object completes a game task set in the virtual scene. The processor is configured to generate an interaction instruction in response to the human-computer interaction operation and transmit the interaction instruction to the server. The memory is configured to store related attribute data, such as object attribute information of a controlled virtual object and held prop attribute information.

In addition, the server 106 includes a processing engine, and the processing engine is configured to perform a storage or reading operation on the database 108. Specifically, the processing engine reads the respective location of each virtual object and aiming shooting information of a shooting prop used by the virtual object from the database 108.

The specific process is as follows: in steps S102-S106, acquire a touch event in the terminal device 102, where the touch event carries touch operation information of at least two touch points. For example, in step S102, touch operation information of at least two touch points of a touch event is acquired, the touch operation information comprising respective locations of the at least two touch points. Next, determine, in a case that the touch operation information indicates that respective operation locations of the at least two touch points are matched with a control location of at least one object control in a display interface, a response priority label corresponding to the at least one object control. For example, in step S104, respective response priority labels corresponding to each of the one or more object controls are determined in response to a determination that at least two of the locations of the touch points are matched with respective locations of one or more object controls in a display interface. Next, according to the response priority label, determine a target control from an object control, and perform a target control operation indicated by the target control. For example, in step S106, a target control is selected from among the one or more object controls according to the respective response priority labels, and a target control operation indicated by the target control is performed. Then, step S108 is performed, and the terminal device 102 transmits the target control operation result information to the server 106 through the network 104, which may be understood that the target control result information is used for indicating the operation result of the target control operation. The server 106 performs step S110, and the server 106 calculates scene response information based on the target control operation result information, which may be understood that the scene response information is response information determined according to the target control operation result information in combination with the virtual scene. Then, in step S112, the server 106 transmits the scene response information to the terminal device 102 through the network 104.

As another implementation, in a case that the terminal device 102 has strong computing processing capability, step S110 may be completed by the terminal device 102. This is an example, and is not limited in this embodiment.

In this embodiment, the terminal device may be a terminal device configured with a target client, and may include but is not limited to at least one of the following: a mobile phone (such as an Android mobile phone and an iOS mobile phone), a notebook computer, a tablet computer, a palm computer, mobile Internet devices (MID), a PAD, a desktop computer and a smart television. The target client may be a client supporting providing of a shooting game task, such as a video client, an instant messaging client, a browser client and an education client. The foregoing network may include but is not limited to: a wired network and a wireless network. The wired network includes: a local area network, a metropolitan area network and a wide area network. The wireless network includes: Bluetooth, WIFI and other networks for realizing wireless communication. The server may be a single server, or may be a server cluster including a plurality of servers, or a cloud server. The foregoing is merely an example, and this is not limited in this embodiment.

In this embodiment, the foregoing method for performing the control operation may be applied to, but not limited to, a game-like terminal application (APP) that completes an established adversarial game task in the virtual scene, for example, a shooting game application in a multiplayer online battle arena (MOBA) application. The adversarial game task may be but not limited to a game task that is completed by a current player through adversarial interaction of a virtual object in a virtual scene performed by the human-computer interaction control operation and a virtual object controlled by other players. The adversarial task may run, but not limited to, in the application (such as a non-independent running game APP) in the form of a plug-in and a mini program, or in the application (such as an independent running game APP) in a game engine. The type of the foregoing game application may include but is not limited to at least one of the following: a two-dimension (2D) game application, a three-dimension (3D) game application, a virtual reality (VR) game application, an augmented reality (AR) game application and a mixed reality (MR) game application. The foregoing is merely an example, and this is not limited in this embodiment.

In this embodiment of the present disclosure, a touch event is acquired; in a case that the touch operation information indicates that respective operation locations of the at least two touch points are matched with a control location of at least one object control in a display interface, a response priority label corresponding to the at least one object control is determined; and a target control is determined from an object control according to a response priority label, and the target control operation indicated by the target control is performed, so that in a case of detecting that the touch event includes a plurality of pieces of touch information, the finally performed control operation is determined according to a matched relationship between the touch event and the object control, thereby solving the technical problem of high complexity of a related operation method for performing the control operation.

The foregoing is merely an example, and this is not limited in this embodiment.

In an implementation, as shown in FIG. 2, the foregoing method for performing the control operation may be performed by an electronic device. In this embodiment, the case where the method is applied to a terminal is taken as an example for description, including the following steps:

S202: Acquire a touch event, where the touch event carries touch operation information of at least two touch points, and the touch operation information includes respective operation location of at least two touch points.

The foregoing touch event may be a touch operation event which is received by a mobile terminal and acts on a display interface, such as a click operation event, a long-press operation event, a drag operation event or a double-click operation event. In this embodiment, the touch operation information may include but is not limited to event mark information, touch location information, touch press strength information and touch press time information corresponding to the touch event. Specifically, in this embodiment, touch operation information of one long-press touch operation event may include: a touch event A (that is, event mark information), (40px, 120px) (that is, location information of the event in an operation interface, 5N (touch press strength information) and 0.1 s (touch press time information). The operation location refers to an action location of a touch point in a display interface, specifically, may be obtained according to the touch location information in the touch operation information so as to determine a touch region of the touch point in the display interface. It may be understood that the specific content of the touch event and the touch operation information is only an example, and the type of the touch operation event and the type of the touch operation information are not limited herein.

It is to be understood that, in this embodiment, the touch event may further include touch operation events of a plurality of touch points, as shown in FIG. 3, in the display interface of the terminal, the electronic device detects a long-press operation of a left finger on an attack control 301, and detects a leftward sliding operation of a right finger in the display interface. It may be understood that the foregoing two touch operation events may be regarded as touch events in this embodiment.

S204: Determine, in a case that the operation locations are matched with a control location of at least one object control in a display interface, a response priority label corresponding to the at least one object control.

Figure 4:
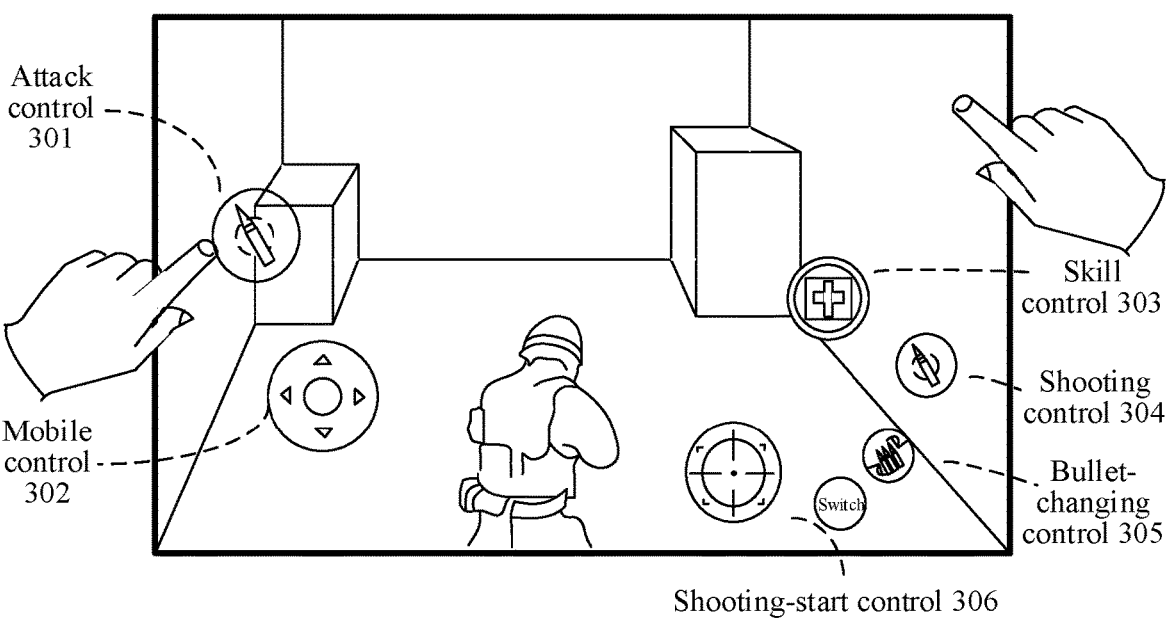
FIG. 4 is a schematic diagram of another method for performing a control operation according to an embodiment of the present disclosure.

Then, the object control in this embodiment is explained. The object control may be an operation control for triggering various control operations in the display interface, and may include but is not limited to an attack control, a mobile control, an aiming control, a bullet-changing control and a skill control. The object control may further include a display region in the display interface other than the foregoing operation control. It may be understood that, in this embodiment, a corresponding control effect may be generated by performing a touch operation in the display interface other than the foregoing control, for example: in a case of detecting a screen-sliding operation in a non-operation-control display region, the viewing angle of a virtual character in the display interface may be controlled for corresponding change. As shown in FIG. 3 and FIG. 4, FIG. 3 shows a scene picture in a virtual viewing angle of a virtual character in the figure. The shown virtual scene shows a virtual wardrobe at a left wall corner. Assuming that a right hand performs a "leftward screen sliding" operation at the touch point B in the non-operation-control display region in FIG. 3, the display interface is shown in FIG. 4. The virtual viewing angle of the virtual character in the figure changes, that is, the viewing angle of the virtual character corresponding moves rightwards, thereby displaying another virtual wardrobe at a right wall corner in the virtual scene.

Then, the response priority label in this embodiment is explained. It may be understood that, in this embodiment, corresponding to each object control, a response priority label is pre-configured to indicate the corresponding priority of the touch operation acting on the control. For different object controls, the response priority label may be the same, or may be different. The configuration principle may be determined according to actual requirements.

For example, in a case that the electronic device detects that a player controls the virtual character to perform a "virtual pathfinding" task in the virtual scene, it is necessary to configure the control effect of sensitive viewing angle steering, so that the response priority in the non-operation-control display region is configured as "1", indicating that the response priority of the touch operation in the non-operation-control display region is the highest; and the response priority of other operation controls is configured as a value greater than "1", indicating that the response priority of the touch operation of the operation control is lower than the priority of the non-operation-control display region. In a case that the player controls the virtual character to perform a "virtual pathfinding" task and the player triggers a plurality of touch operations, the electronic device preferentially responds to the "screen sliding" operation for switching the viewing angle of the virtual character, thereby improving the response effect of the viewing angle steering in the process that the player controls the virtual character to perform the "virtual pathfinding" task.

For another example, in a case of detecting that the player controls the virtual character to perform an "aiming shooting" task in the virtual scene, since the slight change of the aiming viewing angle will affect the shooting accuracy, it is necessary to configure a sensitive "shooting response" effect for the player to reduce the "viewing angle switching response" effect. Therefore, the response priority of the "shooting control" is configured as "1", and the response priority of the non-operation-control display region is configured as a value greater than "1", indicating that the response priority of the touch operation in the display region corresponding to the shooting control is the highest, and the response priority of the touch operation in the non-operation-control display region is lower than the priority of the display region of shooting. Therefore, in a case that the player controls the virtual character to perform the "aiming shooting" task and the player triggers a plurality of touch operations, the electronic device preferentially responds to the touch operation of the "shooting control", and does not respond to the "screen sliding" operation for switching the viewing angle of the virtual angle, thereby improving the shooting response effect of the player controlling the virtual character to perform the "aiming shooting" task.

S206: According to the response priority label, determine a target control from the at least one object control, and perform a target control operation indicated by the target control.

The target control is an object control which is determined to be required for response according to the response priority label, for example, may be an object control with the highest response priority. The target control operation is a control operation which is triggered by the corresponding target control and is required to be performed. The foregoing method is specifically described below with reference to FIG. 3 and FIG. 4.

As shown in FIG. 3, it is a schematic diagram of a game interface where a player controls a virtual character to perform a shooting task in a virtual scene. In this schematic diagram, it shows a plurality of operation controls for controlling a virtual character and a viewing angle scene picture corresponding to a current virtual character. In the virtual scene, it may be observed that a virtual wardrobe is displayed at a left wall corner in a virtual room. Meanwhile, the interface shows the following controls: an attack control 301, configured to control the virtual character to perform an attack operation; a mobile control 302, configured to control the virtual character to perform a mobile operation; a skill control 303, configured to control the virtual character to use a virtual skill; a shooting control 304, configured to control the virtual character to perform another attack operation; a bullet-changing control 305, configured to control the virtual character to perform a magazine-changing operation; and a shooting-start control 306, configured to control the virtual character to perform an aiming operation.

Continuously as shown in FIG. 3, the virtual character in the game interface is in a "virtual pathfinding" task state, thereby determining the response priority of each control. Firstly, the response priority of the non-operation-control display region is determined as "1", the response priority of the attack control 301 is determined as "2", the response priority of the mobile control 302 is determined as "3", the response priority of the skill control 303 is determined as "4", the response priority of the shooting control 304 is determined as "2", the response priority of the bullet-changing control 305 is determined as "5", and the response priority of the shooting-start control 306 is determined as "6".

As shown in FIG. 3, the touch event acquired from the interface includes touch operation information of a touch point A and touch operation information of a touch point B. The touch operation of the touch point A serves as one click operation, and the touch operation information includes: label information: a touch event A, a touch location: (40px, 120px), a touch press strength: 5N, touch press time; and a touch duration: 0.1 s. The touch operation of the touch point B is one leftward sliding operation, and the operation information includes: label information: a touch event B, a touch location: (540Px, 150px), a touch press strength: 5N, and a touch duration: 0.5 s.

Therefore, the electronic device may determine that the touch point A acts on the attack control 301 according to the touch operation information of the foregoing touch point A, and may determine that the touch point B acts on the non-operation-control display interface according to the touch operation information of the touch point B. In this way, the electronic device determines the target control as the non-operation-control display region according to the response priority "2" of the attack control 301 and the response priority "1" of the non-operation-control display region, that is, the electronic device performs the touch response operation corresponding to the touch point B.

Since the effect of performing the "leftward screen sliding" operation on the non-operation-control display region is "rightward switching the viewing angle", so that the display interface is shown in FIG. 4, and the electronic device displays a scene picture of rightward switching the viewing angle based on the original viewing angle. That is, the figure not only shows a virtual wardrobe at a left wall corner in a room, but also shows a virtual wardrobe at a right wall corner in a virtual room because the viewing angle is switched rightwards, so that the effect of performing the target control operation is achieved.

Another specific embodiment of this implementation is described below with reference to FIG. 5 and FIG. 4.

Figure 5:
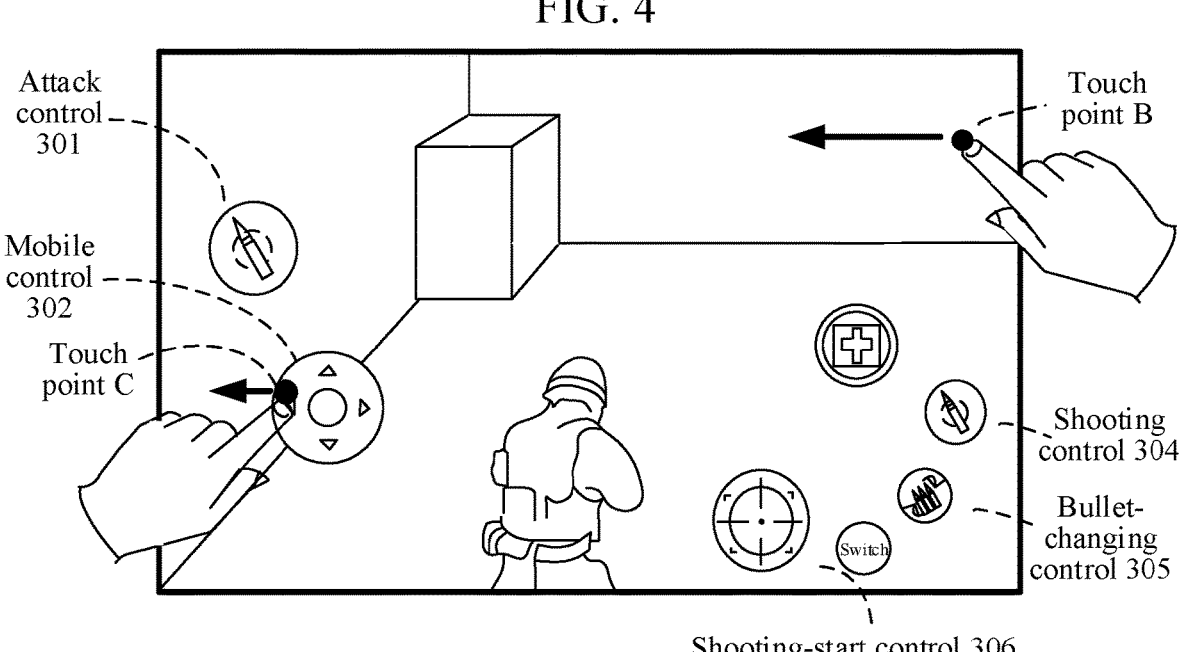
FIG. 5 is a schematic diagram of yet another method for performing a control operation according to an embodiment of the present disclosure.

As shown in FIG. 5, the touch event acquired from the interface includes touch operation information of a touch point C and touch operation information of a touch point B. The touch operation of the touch point C serves as one leftward sliding operation, and the touch operation information includes: label information: a touch event C, a touch location: (40px, 40px), a touch press strength: 5N, touch press time; and a touch duration: 0.5 s. The touch operation of the touch point B is one leftward sliding operation, and the operation information includes: label information: a touch event B, a touch location: (540px, 150px), a touch press strength: 5N, and a touch duration: 0.5 s.

In this way, the electronic device may determine that the touch point C acts on the mobile control 302 according to the touch operation information of the touch point C, and the action effect is to control the virtual character to move leftwards. It may be determined that the touch point B acts on the non-operation-control display interface according to the touch operation information of the touch point B. In this way, the electronic device determines the target control as the non-operation-control display region according to the response priority "3" of the mobile control 302 and the response priority "1" of the non-operation-control display region, that is, the electronic device performs the touch response operation corresponding to the touch point B.

Since the effect of performing the "leftward screen sliding" operation on the non-operation-control display region is "rightward switching the viewing angle", so that the display interface is shown in FIG. 4, and the electronic device displays a scene picture of rightward switching the viewing angle based on the original viewing angle. That is, the figure not only shows a virtual wardrobe at a left wall corner in a room, but also shows a virtual wardrobe at a right wall corner in a virtual room because the viewing angle is switched rightwards, so that the effect of performing the target control operation is achieved.

Still another specific embodiment of this implementation is described below with reference to FIG. 5 and FIG. 6.

Assuming that a task that is required to be performed in the game scene where the current virtual character is located is "escape", the response priority of the mobile control 302 is adjusted as "1", and the response priority of the non-operation-control display region is adjusted as "2". In a case of acquiring the touch information of two touch points shown in FIG. 5, the electronic device determines the target control as the mobile control 302, that is, perform a control operation corresponding to the mobile control 302. Furthermore, as shown in FIG. 6, the virtual character moves leftwards for a certain distance from the original location, but the viewing angle direction of the virtual character is not changed, so the virtual scene in other viewing angles is not shown in FIG. 6.

In this embodiment of the present disclosure, the electronic device acquires a touch event; determines, in a case that the touch operation information indicates that respective operation locations of the at least two touch points are matched with a control location of at least one object control in a display interface, a response priority label corresponding to the at least one object control; and a target control is determined from an object control according to a response priority label, and the target control operation indicated by the target control is performed, so that in a case of detecting a plurality of touch events, the finally performed control operation is determined according to a matched relationship between the touch event and the object control, thereby solving the technical problem of high complexity of a related operation method for performing the control operation.

In an implementation, the foregoing according to the response priority label, determining a target control from the at least one object control, and performing a target control operation indicated by the target control includes:

S1: Sort the response sequence of the at least one object control according to the response priority label to obtain a sorting result.

S2: Determine, in a case that the sorting result indicates an object control with the highest response priority as an object control, the object control with the highest response priority as the target control, and perform the target control operation indicated by the target control.

In this embodiment, respective operation locations of at least two touch points are matched with the control locations of a plurality of object controls, that is, the touch event acts on at least two object controls, so it is necessary to determine a target control required to perform response from the at least two object controls. The priority label may be configured for each object control before a game starts, may be configured in a game according to a specific scene, may be configured in a game according to the setting operation of a player, or may be configured according to a real-time game scene. An opportunity of determining the priority label is not limited herein.

The foregoing method is described by taking the priority label in the foregoing embodiment as an example. Continuously taking FIG. 3 as an example, it is assumed that the response priority of the non-operation-control display region is determined as "1", the response priority of the attack control 301 is determined as "2", the response priority of the mobile control 302 is determined as "3", the response priority of the skill control 303 is determined as "4", the response priority of the shooting control 304 is determined as "2", the response priority of the bullet-changing control 305 is determined as "5", and the response priority of the shooting-start control 306 is determined as "6".

In this way, in a case that the electronic device acquires three touch operations of the touch event, namely, a touch operation D, a touch operation E and a touch operation F, the touch points of the corresponding touch operations sequentially and respectively correspond to a non-operation-control display region (the priority is "1"), a mobile control 302 (the priority is "3") and a shooting-start control 306 (the priority is "4"), the response sorting results of the object controls corresponding to the touch operation D, the touch operation E and the touch operation F are determined as follows: in a case of the non-operation-control display region (the priority is "1"), the mobile control 302 (the priority is "3") and the shooting-start control 306 (the priority is "4").

According to the foregoing sorting result, the electronic device determines that the non-operation-control display region is the target control and performs the touch operation D indicated by the non-operation-control display region so as to display the corresponding scene after the viewing angle is switched. Electronic device Through the method provided by the foregoing embodiments of this disclosure, the response sequence of the object control is sorted according to the response priority label to obtain a sorting result; and in a case that the sorting result indicates that the object control with the highest response priority is one object control, the object control with the highest response priority is determined as a target control, and a target control operation indicated by the target control is performed, so that in a case that a plurality of touch operations are present in a current display interface, the finally performed control operation is determined according to the response priority of a plurality of target controls corresponding to the plurality of touch operations, thereby avoiding the problem of controlling the response confusion in a case that the plurality of touch operations are present, and solving the technical problem of high complexity of a related operation method for performing the control operation.

In an implementation, after the foregoing sorting the response sequence of the at least one object control according to the response priority label to obtain a sorting result, the method further includes:

S1: Determine, in a case that the sorting result indicates that the object control with the highest response priority includes at least two object controls, respective control operation time of the at least two object controls.

S2: Determine the object control with the earliest control operation time as the target control, and perform the target control operation indicated by the target control.

Another embodiment of the foregoing implementation is described below with reference to FIG. 7.

Figures 6, 7:
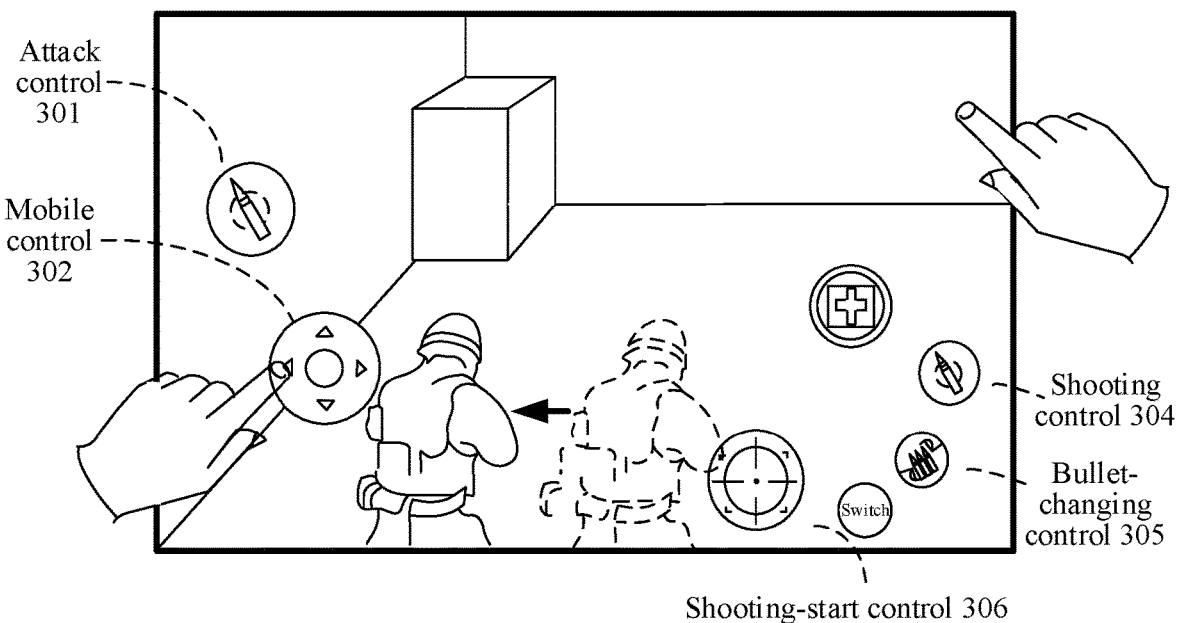
FIG. 6 is a schematic diagram of yet another method for performing a control operation according to an embodiment of the present disclosure.
FIG. 7 is a schematic diagram of yet another method for performing a control operation according to an embodiment of the present disclosure.

As shown in FIG. 7, in the interface, two touch operations corresponding to a touch point I and a touch point J are present. The touch point I acts on the attack control 301, the action time is 6:00.00 after the game starts and the duration is 0.5 s, that is, continuing to 6:00.50 after the game starts; and the touch point J acts on the shooting control 304, the action time is 6:00.10 after the game starts and the duration is 0.3 s, that is, continuing to 6:00.40 after the game starts. It can be seen that, in this embodiment, a period of continuous time is present in the touch operation of the touch point I, and another touch operation is detected in the continuous time.

Then, the electronic device determines the target control according to the priorities of two controls corresponding to the touch point I and the touch point J. It is continuously assumed that the response priority of the attack control 301 is "2", and the response priority of the shooting control 304 is "2". It can be seen that the corresponding priorities of the two controls are the same. In this way, the electronic device determines the earliest object control as the attack control 301 according to the operation time so as to perform the control operation corresponding to the attack control 301. it is assumed that the attack mode corresponding to the attack control 301 is sniping shooting, and the attack mode corresponding to the shooting control 304 is grapeshot shooting. Therefore, the final control result is to control the virtual character to perform sniping shooting.

Through the above implementation of this disclosure, in a case that the sorting result indicates that the object control with the highest response priority includes at least two object controls, the electronic device determines respective control operation time of the at least two object controls; and the object control with the earliest control operation time is determined as the target control, and the target control operation indicated by the target control is performed, thereby avoiding the problem of controlling the response confusion in a case that the plurality of touch operations are present, and solving the technical problem of high complexity of a related operation method for performing the control operation.

In an implementation, the foregoing according to the response priority label, determining a target control from the at least one object control, and performing a target control operation indicated by the target control includes:

S1: Determine, in a case that the respective operation locations of the at least two touch points are matched with the control location of one object control in the display interface, the object control as the target control.

S2: Determine respective touch time of each of the touch points on the target control;

S3: Determine an operation triggered by the touch point with the earliest touch time as a target control operation to be performed.

S4: Perform the target control operation.

An embodiment of the foregoing implementation is described below with reference to FIG. 8.

Figures 8, 9:
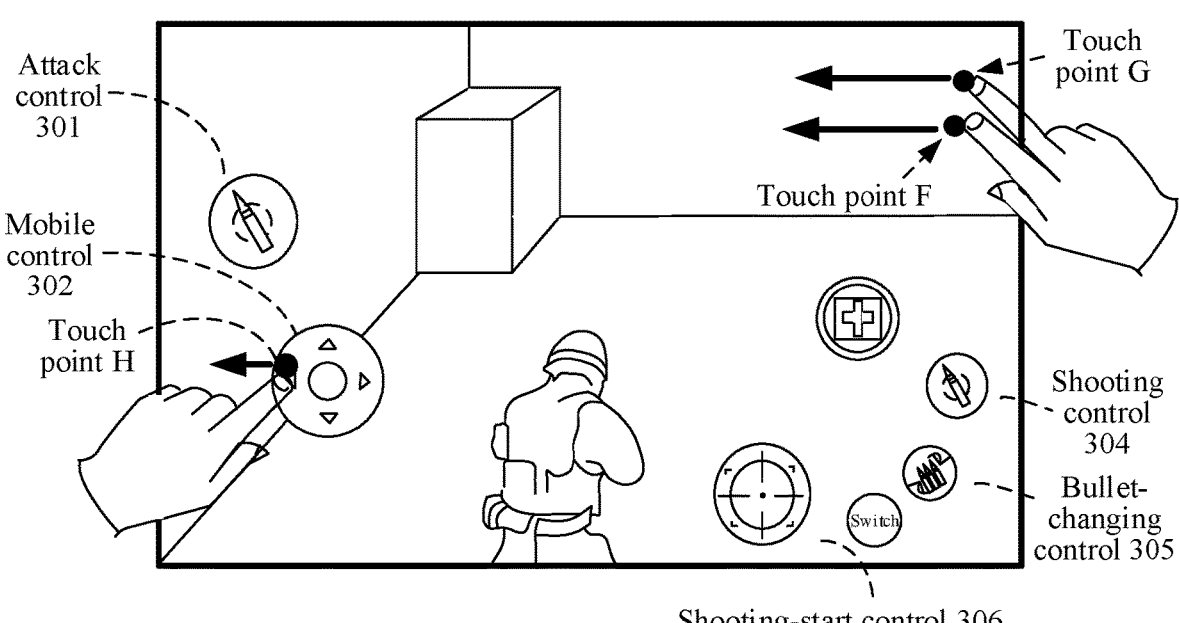
FIG. 8 is a schematic diagram of yet another method for performing a control operation according to an embodiment of the present disclosure.
FIG. 9 is a flowchart of another method for performing a control operation according to an embodiment of the present disclosure.

As shown in FIG. 8, three touch operations are present in the display interface, respectively corresponding to a touch point F, a touch point G and a touch point H. The touch operations corresponding to the touch point F and the touch point G act on the non-operation-control display region, and the operation mode is "leftward screen sliding". The touch operation of the touch point H acts on the mobile control 302, and the operation mode is "leftward screen sliding". According to the response priority "1" of the non-operation-control display region and the response priority "3" of the mobile control 302, the sorting result may be determined as a non-operation-control display region and a non-operation-control display region (two controls are tied for the first place), and a mobile control 302. In this way, the electronic device is required to further determine the operation corresponding to the target control from the two operations of the non-operation-control display regions.

It is assumed that the operation time corresponding to the touch point F is 5:00.00 after the game starts and the duration is 0.5 s, and the operation time corresponding to the touch point G is 5:00.15 after the game starts and the duration is 0.5 s. Therefore, the operation corresponding to the touch point F is determined as the earliest operation, so the control operation corresponding to the region corresponding to the touch point F is performed, that is, the virtual viewing angle of the game scene is switched rightwards correspondingly.

Through the foregoing implementation of this disclosure, in a case that the respective operation locations of the at least two touch points are matched with the control location of one object control in the display interface, the electronic device determines one object control as a target control; respective touch time of each of the touch points on the target control is determined; an operation triggered by the touch point with the earliest touch time is determined as a target control operation to be performed; and the target control operation is performed, so that in a case that a plurality of touch points are present in the same touch region in the display interface, the finally performed control operation is determined according to the sequence of the touch time of the touch point, thereby avoiding the problem of controlling the response confusion in a case that the plurality of touch operations are present, and solving the technical problem of high complexity of a related operation method for performing the control operation.

In an implementation, after the foregoing performing the target control operation indicated by the target control, the method further includes:

S1: Acquire, in a case that the number of the at least two touch points changes, an updated response priority label.

S2: According to the updated response priority label, sort the response sequence of the object control to obtain an updated sorting result.

S3: Determine the target control operation to be performed according to the updated sorting result.

It may be understood that in this implementation, in a case that a plurality of touch points are present in the interface and the number of the touch points is changed, rearrangement is performed, and the corresponding control operation is performed according to the rearrangement result.

Specifically, description is performed continuously with reference to FIG. 8. As shown in FIG. 8, in the electronic device, three touch operations are present in the display interface, respectively corresponding to a touch point F, a touch point G and a touch point H. The touch point F and the touch point G act on the non-operation-control display region, and the operation mode is "leftward screen sliding". The touch point H acts on the mobile control 302, and the operation mode is "leftward screen sliding". According to the response priority "1" of the non-operation-control display region and the response priority "3" of the mobile control 302, the sorting result may be determined as a non-operation-control display region and a non-operation-control display region (which are tied for the first place), and a mobile control 302. In this way, the electronic device is required to further determine the operation corresponding to the target control from the two operations of the non-operation-control display regions.

After the electronic device determines that an operation corresponding to the touch point F is a to-be-performed operation and performs the control operation corresponding to a region corresponding to the touch point F, assuming that the touch operation of the touch point F ends, that is, the remaining touch point in the display interface is a touch point G and a touch point H. The electronic device may further determine that the target control is the non-operation-control display region corresponding to the touch point G from the controls corresponding to the touch point G and the touch point H according to the priority label, and perform the operation corresponding to the touch point G, that is, continuously controls the virtual character in the virtual scene to switch the viewing angle rightwards.

Through the above implementation of this disclosure, in a case that the number of at least two touch points changes, the electronic device acquires updated response priority labels corresponding to each of one or more object controls of the updated number of touch points; according to the updated response priority label, the response sequence of the object control is sorted to obtain an updated sorting result; The to-be-performed target control operation is determined according to the updated sorting sequence, so that in a case that the number of the touch points changes, the next performed control operation is dynamically determined according to the updated response priority label and the sorting result, thereby avoiding the problem of controlling the response confusion in a case that the plurality of touch operations are present, and solving the technical problem of high complexity of a related operation method for performing the control operation.

In one embodiment, the touch event includes at least one of a click operation event, a long-press operation event, a drag operation event or a double-click operation event.

The click operation event refers to an operation event that the user clicks the touch point on the display interface, the long-press operation event refers to an operation event that the user long presses the touch point on the display interface, the drag operation event refers to an operation event that the user drags the touch point on the display interface, and the double-click operation event refers to an operation event that the user doubly clicks the touch point on the display interface. The touch event may include at least one type of operation event.

In this embodiment, the touch event includes at least one of a click operation event, a long-press operation event, a drag operation event or a double-click operation event, so that in a case that different types of operation events are triggered, the finally performed control operation may be determined according to the matching relationship between the touch event and the object control, thereby solving the technical problem of high complexity of a related operation method for performing the control operation.

In one embodiment, the response priority label corresponding to each of the object controls is configured according to a scene of the display interface.

Under different scenes, pictures displayed in the display interface may be different, and the type, number and distribution of the object controls in the display interface may be different. Specifically, the response priority label corresponding to the object control included in the display interface is configured according to the scene of the display interface. The response priority label specifically may be configured by default according to the scene to which the display interface belongs, or may be individually configured by a user according to the operation requirement in the scene.

In this embodiment, the response priority label corresponding to the object control is configured through the scene to which the display interface belongs, so that the response priority of the object control in the display interface can be more in line with the requirement of the scene, and the processing efficiency of the control operation under different scenes can be improved.

In an implementation, that in a case that the operation locations are matched with a control location of at least one object control in the display interface, the response priority label corresponding to the at least one object control is determined includes:

S1: Acquire response region information of each object control in the display interface.

S2: Sequentially compare the operation location of each touch point indicated by the touch operation information with a control response region indicated by the response region information of each object control to obtain a comparison result.

S3: Determine, in a case that the comparison result indicates that the operation location of the touch point is located in the control response region of the object control, that the operation location of the touch point is matched with the control location of the object control, and acquire the response priority label of the determined matched object control.

S4: Save the response priority label of the determined matched object control into a management container.

In this implementation, taking the performing mode of the screen-sliding operation as an example, the specific implementation of the foregoing method for performing the control operation is described.

It may be understood that one completed screen-sliding operation includes three event stages, which may be described as press, slide and release. Firstly, before a game starts, three events, namely IE_Pressed (press), IE_Repeat (slide) and IE_Released (release) are registered to a touch component of a game engine, so as to detect the touch events of the foregoing three stages such as press, slide and release.

In this embodiment, region information of the foregoing object control may include but is not limited to location information and range information of the object control in the display interface, so as to determine the object control corresponding to the touch operation. It may be understood that the region information of the object control may be determined and saved before the game starts, or may be changed according to the setting of a player in the game process and then perform updating and saving. For example, before the game starts, a plurality of controls, such as an attack control, a mobile control and a shooting-start control, in the interface, and location information and range information of a non-control display region are saved; and in the game process, assuming that the game player adjusts the locations and sizes of the attack control and the mobile control, the saved location information and range information of the attack control and mobile control are correspondingly updated. A method for determining the region information of the object control is not limited herein.

In specific applications, a method for performing a control operation may further include:

S1: Acquire touch operation information.

As shown in FIG. 9, in the process of detecting the event IE_Pressed, the touch operation information is acquired first. In this embodiment, the acquired touch operation information includes at least a "current finger index" (that is, identifier information of the current touch operation), and screen location information corresponding to the touch operation.

S2: Determine a control corresponding to the screen location information.

Specifically, in a case that the saved response region information of the object control is acquired, the location information of the current touch operation is compared with the saved response region information of the object control, thereby determining the object control corresponding to the current touch operation.

S3: Acquire the priority label corresponding to the object control.

S4: Finally, perform data processing.

Figures 10, 11:
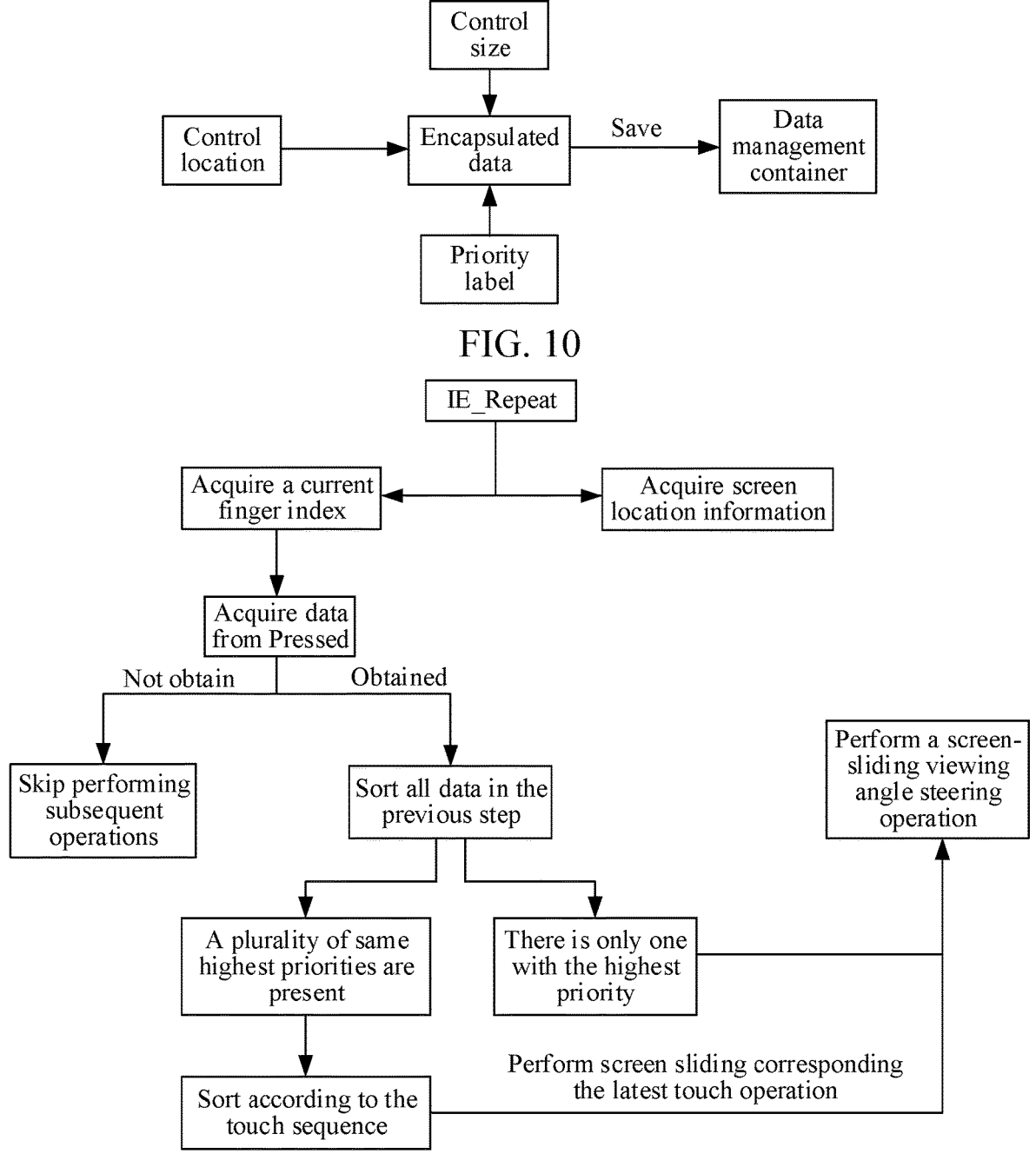
FIG. 10 is a schematic diagram of yet another method for performing a control operation according to an embodiment of the present disclosure.
FIG. 11 is a flowchart of still another method for performing a control operation according to an embodiment of the present disclosure.

Specifically, as shown in FIG. 10, the control location, the control size and the priority label may be encapsulated, and are saved in a data management container together with the "current finger index", that is, the identifier information of the current touch operation, as key words.

Through the foregoing implementation of this disclosure, the electronic device acquires the response region information of the object control in the display interface; the operation location of each touch point indicated by the touch operation information is sequentially compared with a control response region indicated by the response region information of each object control to obtain a comparison result; in a case that the comparison result indicates that the operation location of the touch point is located in the control response region of the object control, it is determined that the operation location of the touch point is matched with the control location of the object control, and acquire the response priority label of the determined matched object control; and the response priority label of the determined matched object control is saved into a management container, thereby accurately acquiring the touch event of each touch operation and accurately detecting and responding the touch operation.

In an implementation, the foregoing according to the response priority label, determining a target control from the at least one object control, and performing a target control operation indicated by the target control includes:

S1: Read the response priority label of the determined matched object control from the management container.

S2: According to the response priority label, determine the target control from the determined matched object control, and perform the target control operation indicated by the target control.

One implementation of the foregoing method is described with reference to FIG. 11.

It may be understood that, in this embodiment, for the performing mode of the screen-sliding operation, the IE_Repeat event is detected in addition to detecting the IE_Pressed event. This step is as follows:

S1: Acquire touch operation information.

In the process of detecting the IE_Repeat event, the acquired touch operation information includes at least a "current finger index" (that is, identifier information of the current touch operation), and screen location information corresponding to the touch operation.

S2: Acquire data from Pressed.

Specifically, data is acquired from the Pressed management container by taking the "current finger index" as key words.

S3: Skip performing any operation in a case that corresponding data is not acquired.

S4: Sort all data in the previous step in a case that the corresponding data is acquired.

It may be understood that, in this embodiment, The "screen-sliding operation" is subjected to response processing, so to ensure the detection accuracy of the "slide" event, the electronic device is required to perform data matching and acquisition in the Pressed management container with the same "current finger index", thereby ensuring that each "slide" event is triggered by the "press" event.

Then, the data saved in the Pressed management container includes the priority of the object control corresponding to the touch operation, so that the electronic device sorts the object controls corresponding to all data in the Pressed management container according to the acquired priority label.

S5: Perform a screen-sliding viewing angle steering operation corresponding to the object control with the highest priority in a case that only one determined highest priority is present.

S6: In a case that a plurality of same highest priorities are present, perform sorting according to the screen-touching sequence, and perform screen-sliding viewing angle steering corresponding to the latest screen-touching operation.

Through the foregoing embodiments of this disclosure, the electronic device reads the response priority label of the determined matched object control from the management container; and according to the response priority label, the target control is determined from the determined matched object control, and the target control operation indicated by the target control is performed, so that the target control which is finally required to be performed is determined according to the saved response priority label, and the touch operation is accurately detected and responded.

In an implementation, after the foregoing performing the target control operation indicated by the target control, the method further includes: remove the response priority label of the target control from the management container.

Figures 12, 13:
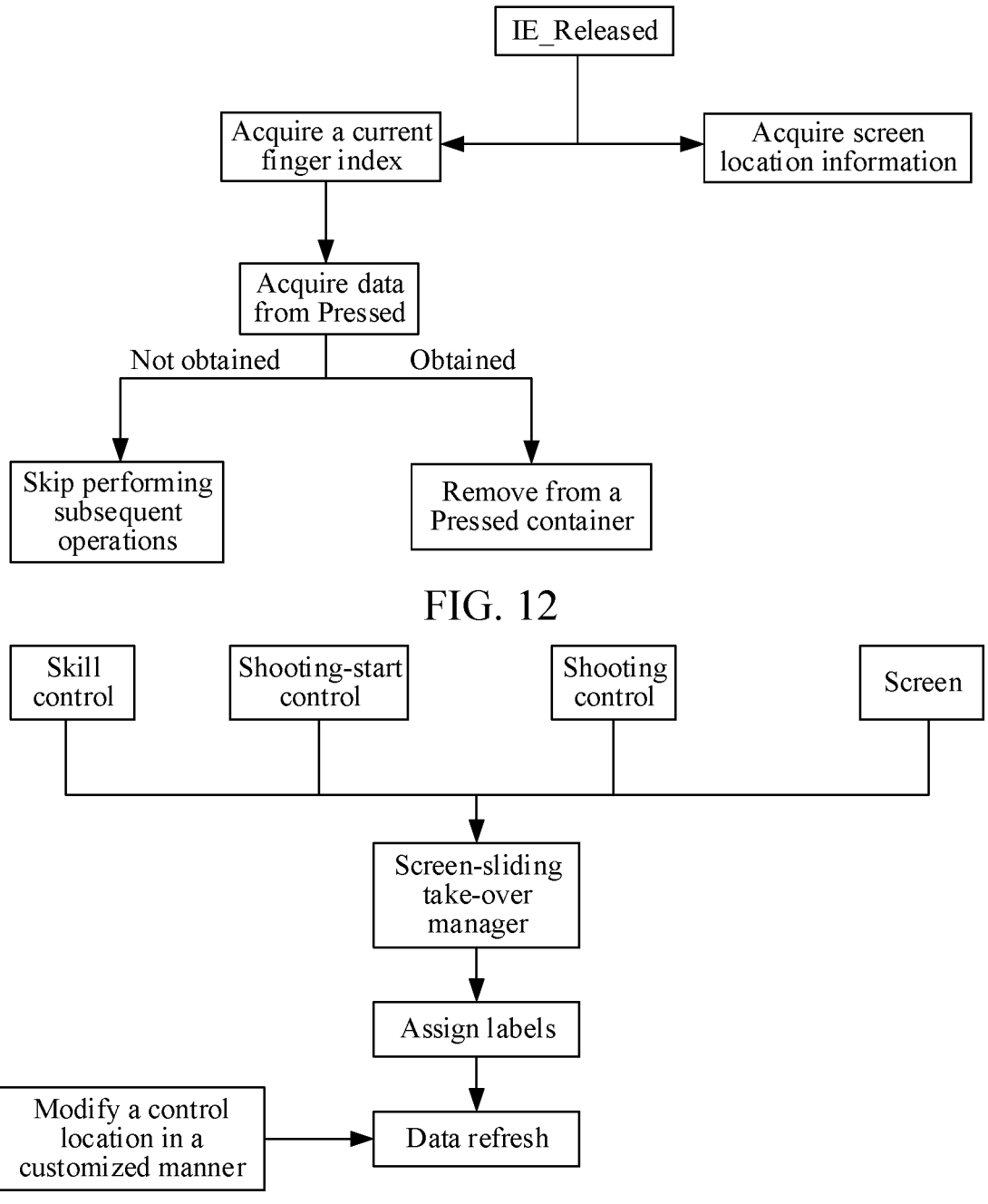
FIG. 12 is a flowchart of still another method for performing a control operation according to an embodiment of the present disclosure.
FIG. 13 is a flowchart of another method for performing a control operation according to an embodiment of the present disclosure.

As shown in FIG. 12, in this embodiment, in addition to detecting the events IE_Pressed and IE_Repeat, the electronic device further detects the event IE_Released, that is, detects whether the touch event ends.

It may be understood that in the process of detecting the event IE_Released, the touch operation information acquired by the electronic device further includes a "current finger index" and a "pressed screen location", thereby acquiring data from the Pressed management container by taking the "current finger index" as key words. In a case that the data is acquired, the electronic device deletes the foregoing acquired data from the management container.

Through the foregoing embodiments of this disclosure, after the foregoing performing the target control operation indicated by the target control, the electronic device removes the response priority label of the target control from the management container, so that in the process of sorting the data of the touch event in IE_Repeat, the released touch operation can be directly ignored, and error response of a plurality of touch operations can be avoided.

In an implementation, before the foregoing acquiring a data display request, the method further includes the following steps:

S1: Assign the response priority label for each of the object controls.

S2: Acquire the response region information of the object control, where the response region information is used for indicating a control response region of the object control in the display interface.

S3: Encapsulate the response priority label of the object control and the response region information, and save the response priority label of the object control and the response region information in the management container.

It may be understood that, in this embodiment, before the touch event is acquired, the electronic device is required to assign the response priority label to each object control and determine a response location and a response region of each object control. In an implementation, the response priority label and determining the response location and the response region of each object control may be set according to game setting before the game starts, or may be set in the game process according to the setting operation of the player. After each setting, the foregoing information is encapsulated and saved in the management container, thereby facilitating the extraction and use of the foregoing data in the subsequent operations.

Through the foregoing embodiments of this disclosure, the electronic device assigns the response priority label for each object control; the response region information of the object control is acquired, where the response region information is used for indicating a control response region of the object control in the display interface; and the response priority label and the response region information of the object control are encapsulated and saved in the management container, so that the priority, location and region range of the object control can be set according to requirements, the response to the touch operation is more accurate, and the technical problem of high complexity of a related operation method for performing the control operation is solved.

One specific embodiment of this disclosure is described below with reference to FIG. 13 and FIG. 14.

In this embodiment, the performing method for processing the screen-sliding operation in the game interface is taken as an example for description. The touch event includes an event triggered by the screen-sliding operation; and the management container includes a screen-sliding manager.

As shown in FIG. 13, it is a preprocessing process of a management method of a touch operation.

S1: Add a plurality of controls for responding the screen-sliding operation to the screen-sliding manager.

It is assumed that in the game, the control related to the screen-sliding operation includes a "skill control", a "shooting-start control", a "shooting control" and a "screen". Correspondingly, the screen-sliding operation on the "skill control" may be used for adjusting the aiming direction of a virtual skill, the screen-sliding operation on the "shooting-start control" may be used for adjusting the aiming direction of the shooting operation, the screen-sliding operation performed on a "shooting prop" may be used for adjusting the shooting direction of the shooting prop, and the screen-sliding operation performed on a "screen" may be used for adjusting the viewing angle of a current virtual character. The foregoing four controls are related to the screen-sliding operation, but the operation effects are different. Meanwhile, the screen-sliding operation is a long-time operation (relative to an instantaneous click operation), so the player may perform a plurality of screen-sliding operations at the same time in a period of time, so that it is necessary to perform control response processing on the plurality of operations within the same time.

S2: Assign the plurality of controls for responding the screen-sliding operation to respective response priority labels.

Specifically, to avoid the effect interference among the plurality of screen-sliding operations, the response priorities "3", "2", "2" and "1" may be respectively configured for the "skill control", the "shooting-start control", the "shooting control" and the "screen". That is, in this embodiment, the response priority of the screen-sliding operation on the "screen" is the highest, the response priorities of the screen-sliding operations on the "shooting-start control" and the "shooting control" are the second highest and are the same, and the priority of the screen-sliding operation on the "skill control" is the lowest.

S3: Screen-sliding data of the screen-sliding operation is encapsulated and saved.

As shown in FIG. 10, the electronic device saves the control location, the control size and the priority label to a data management container in a screen-sliding take-over manager, thereby facilitating calling of specific data in the subsequent operations.

S4: Refresh data in the data management container after saving.

It may be understood that data refreshing will be triggered after the electronic device encapsulates and saves existing priority data, and data refreshing will also be triggered in a case that the control location is modified in a customized manner. For example, in the game process, the player adjusts the location and size of the control. For the adjusting operation performed by the player, the data in the data management container is refreshed to ensure the accuracy of the management in the subsequent control operation.

In one embodiment, the screen-sliding data includes a control location, a control size and a response priority label; and the encapsulating and saving screen-sliding data of the screen-sliding operation includes: encapsulate the control location, control size and response priority label, and save a result obtained by the encapsulating into a data management container of the screen-sliding manager.

The control location refers to a location of the control, for responding the screen-sliding operation, in the display interface; the control size refers to a size of the control for responding the screen-sliding operation; and the response priority label is a label that is assigned for the control for responding the screen-sliding operation. Specifically, the electronic device encapsulates the control location, control size and response priority label, and saves a result obtained by the encapsulating into a data management container of the screen-sliding manager.

In this embodiment, the control location, the control size and the response priority label are encapsulated and stored in the data management container of the screen-sliding manager, so that the screen-sliding data can be stored in time, and it is beneficial to ensure the accuracy of management in the subsequent control operation.

After the pre-data preparation, the specific implementation of this embodiment is described below with reference to FIG. 14.

It may be understood that in the specific implementation process, it is necessary to register three events related to the "screen-sliding operation", namely IE_Pressed (press), IE_Repeat (slide) and IE_Released (release) to a touch component of a game engine, so as to detect the events at the foregoing three stage of press, slide and release, thereby accurately determining the "screen-sliding operation".

Then, through the foregoing three detection events, the electronic device acquires Index (that is, the current finger index) and Location (that is, the pressed screen location) information of the touch operation, and records the related information. Then, the electronic device inputs the related data to the screen-sliding take-over manager for priority sorting. Finally, the viewing angle steering operation corresponding to the screen-sliding operation is performed according to the sorting result.

The foregoing method is specifically described below with reference to FIG. 3 and FIG. 4.

As shown in FIG. 3, it shows two touch operations on the interface, where a control corresponding to a touch point A is an attack control 301, and a control corresponding to a touch point B is a screen.

It is assumed that Index detected and recorded by a rightward-sliding operation performed by the touch point A through IE_Pressed is an "event A", and the location information is (40px, 120px). Then, the electronic device inputs the Index "event A" and the location information (40px, 120px) to the screen-sliding take-over manager, the control corresponding to the "event A" is determined as the attack control 301 according to comparison between the control location information saved in the management container and the location information (40px, 120px) of the "event A" in the screen-sliding take-over manager, and the corresponding priority "2" is acquired according to the response priority label configured by the attack control 301. Finally, the electronic device saves the "event A", the location information (40px, 120px) and the priority label "2" to the Pressed container.

It is assumed that Index detected and recorded by a leftward-sliding operation performed by the touch point B through IE_Pressed is an "event B", and the location information is (540px, 150px). Then, the electronic device inputs the Index "event B" and the location information (540px, 150px) to the screen-sliding take-over manager, the control corresponding to the "event B" is determined as the screen according to comparison between the control location information saved in the management container and the location information (540px, 150px) of the "event B" in the screen-sliding take-over manager, and the corresponding priority "1" is acquired according to the response priority label configured by the screen. Finally, the electronic device saves the "event B", the location information (540px, 150px) and the priority label "1" to the Pressed container.

Then, Index of the touch point B detected and recorded through IE_Repeat is the "event B", and the location information is (540px, 150px), so that the electronic device inputs the Index "event B" of the touch point B into the screen-sliding take-over manager again, and performs data acquisition in the Pressed container.

In a case that the data "event B", location information (540px, 150px) and priority label "1" corresponding to Index "event B", and the data "event A", location information (40px, 120px) and priority label "2" corresponding to the touch point A are acquired, the electronic device compares the two events with the control priority, determines the "event B" corresponding to the touch point B as the target event, and performs the "event B". Therefore, the display interface, as shown in FIG. 4, steers the viewing angle of the virtual character rightwards.

After it is determined that the event corresponding to Index "event B" is performed, the electronic device deletes data corresponding to Index "event B" in the Pressed container. Then, the electronic device sorts and performs the remaining events in the Pressed container, so as to determine that the "event A" is performed, that is, in the display interface after the viewing angle is steered shown in FIG. 4, the virtual character is controlled to perform the shooting operation.

In one embodiment, as shown in FIG. 15, a method for performing a control operation is provided and performed by an electronic device. The method includes:

S1502: Display a display interface, where the display interface includes an object control for responding a touch event, and the object control is arranged at a control location in the display interface. For example, a display interface comprising two or more object controls responsive to touch input is displayed, each object control being arranged at a corresponding control location in the display interface.

S1504: In a case that at least two touch points in the display interface trigger a touch event and respective operation locations of the at least two touch points are matched with the control location of at least one object control in the display interface, perform a target control operation that is indicated by a target control and belongs to a target type, where the touch event is used for triggering to perform control operation of the target type, and the target control is a control, meeting a response priority condition, of the at least one object control. For example, a target control operation is performed, the target control operation being indicated by a target control corresponding to one of the one or more object controls matched to the locations of the touch points. The target control operation is performed in response to a determination that at least two touch points in the display interface trigger a touch event and respective locations of the at least two touch points are matched with a control location of one or more object controls in the display interface. The target control is one of the one or more object controls matched to the locations of the touch points that meets a response priority condition.

The display interface is an interface displayed on a screen of the electronic device; the display interface includes at least one object control for responding a touch event; and the object control is arranged at the control location in the display interface, that is, a corresponding object control is displayed at the control location in the display interface of the electronic device. The touch event may be triggered by various types of operation events. The control operation refers to an operation that a user needs to trigger through the touch event. In this embodiment, the touch events triggered by the user for at least one object control are used for triggering to perform the target type of control operation, that is, are used for triggering the same type of control operation. For example, in the game interface, the user triggers the touch event for a plurality of object controls, for example, the user triggers a screen-sliding operation for the plurality of object controls so as to trigger to perform the control operation for lens steering. For the target type of control operation, different object controls have different response priorities. A response priority condition is used for controlling the response sequence relationship of the touch events by the object control. For example, the response priority condition may perform response according to the response sequence from high response priority to low response priority, then the object control with the highest response priority may be determined as a target control, and the target type of target control operation indicated by the target control is performed.

Specifically, the electronic device displays the display interface, the object control for responding the touch event is displayed at the control location of the display interface, and the user may trigger interaction for the object control. In a case that at least two touch points in the display interface trigger a touch event and respective operation locations of the at least two touch points are matched with the control location of at least one object control in the display interface, the electronic device performs a target control operation that is indicated by a target control and belongs to a target type. In the specific application, the user may trigger the touch event for at least two touch points in the display interface, the electronic device determines respective operation locations of the at least two touch points and matches the operations locations respectively with the control location of at least one object control in the display interface. In a case that the operations locations are respectively matched with the control location of at least one object control in the display interface, the electronic device determines the target control from at least one object control according to the response priority condition, and performs the target control operation that is indicated by the target control and belongs to the target type.

In this embodiment, in a case that the touch event is triggered for the at least two touch points in the display interface, and the respective operation locations of the at least two touch points are matched with the control location of the at least one object control in the display interface, the electronic device performs the target control operation that is indicated by the target control meeting the response priority condition and belongs to the target type, so that in a case that a plurality of touch events are detected, the finally performed control operation is determined according to the matching relationship between the touch event and the object control, thereby solving the technical problem of high complexity of a related operation method for performing the control operation.

In one embodiment, the touch event includes an event triggered by a screen-sliding operation; and a target control operation includes a viewing angle steering operation.

The screen-sliding operation is a screen-sliding interaction operation performed by a user for the object control in the display interface; and the viewing angle steering operation is a control operation of changing the corresponding viewing angle of the display content in the display interface, and the display content in the display interface may be changed by changing the viewing angle.

In this embodiment, in a case that the event is triggered by the screen-sliding operation triggered for the at least two touch points in the display interface, and the respective operation locations of the at least two touch points are matched with the control location of the at least one object control in the display interface, the electronic device performs a viewing angle steering operation indicated by the target control meeting the response priority condition, so that in a case that a plurality of screen-sliding operations are detected, the viewing angle steering operation indicated by the target control meeting the response priority condition is selected and performed, thereby solving the problem of high complexity of a related operation method of the viewing angle steering operation.

For simple description, the foregoing method embodiments are represented as a series of action combinations, but a person skilled in the art appreciates that the present disclosure is not limited to the described order of the actions because some steps may be performed in another order or performed simultaneously according to the present disclosure. In addition, a person skilled in the art also knows that all the embodiments described in this specification are exemplary embodiments, and the related actions and modules are not necessarily required in the present disclosure.

Figure 16:
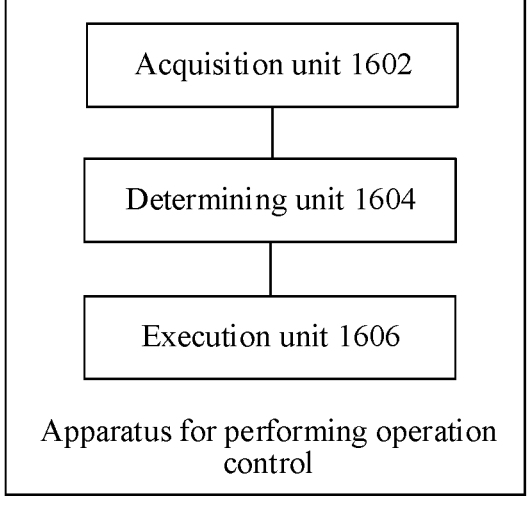
FIG. 16 is a schematic structural diagram of an apparatus for performing a control operation according to an embodiment of the present disclosure.

According to another aspect of the embodiments of the present disclosure, an apparatus for performing a control operation of the foregoing method for performing the control operation is further provided. As shown in FIG. 16, the apparatus includes:

an acquisition unit 1602, configured to acquire a touch event, where the touch event carries touch operation information of at least two touch points, and the touch operation information includes respective operation locations of the at least two touch points;

a determining unit 1604, configured to: in a case that the operation locations are matched with a control location of at least one object control in a display interface, determine a response priority label corresponding to the at least one object control; and an execution unit 1606, configured to: according to the response priority label, determine a target control from the at least one object control, and perform a target control operation indicated by the target control.

In this embodiment, the embodiments implemented by the foregoing unit modules may be referenced to the foregoing method embodiments, which will not be elaborated herein.

Figure 17:
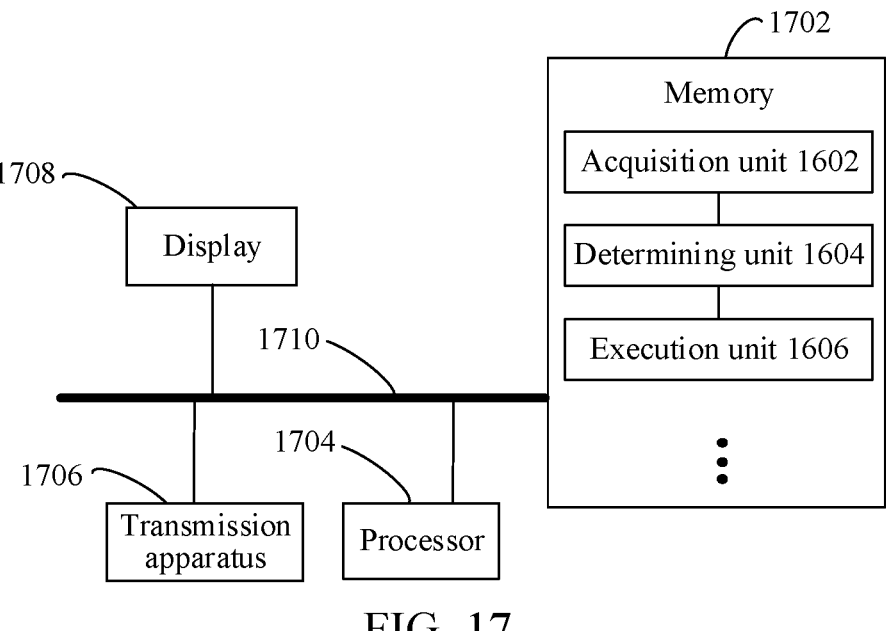
FIG. 17 is a schematic structural diagram of an electronic device according to an embodiment of the present disclosure.

According to yet another embodiment of the present disclosure, an electronic device for performing the foregoing method for performing the control operation is further provided. The electronic device may be a terminal device or server shown in FIG. 17. This embodiment takes the case where the electronic device is the terminal device as an example for description. As shown in FIG. 17, the electronic device includes a memory 1702 (non-transitory computer-readable storage medium) and a processor 1704 (processing circuitry). The memory 1702 stores a computer-readable instruction. The processor 1704 is configured to perform the steps of any one of the foregoing method embodiments through the computer-readable instruction. The term "processing circuitry" used herein includes one or more processors. The term "non-transitory computer-readable storage medium" used herein includes one or more memories or data storage structures.

In this embodiment, the foregoing electronic device may be located in at least one network device of a plurality of network devices in a computer network.

In this embodiment, the processor may be configured to perform the following steps through the computer-readable instruction:

S1: Acquire a touch event, where the touch event carries touch operation information of at least two touch points, and the touch operation information includes respective operation locations of the at least two touch points.

S2: Determine in a case that the operation locations are matched with a control location of at least one object control in a display interface, a response priority label corresponding to the at least one object control.

S3: According to the response priority label, determine a target control from the at least one object control, and perform a target control operation indicated by the target control.

A person of ordinary skill in the art may understand that, the structure shown in FIG. 16 is only illustrative. The electronic device may also be a terminal device such as an in-vehicle terminal, a smartphone (such as an Android mobile phone or an iOS mobile phone), a tablet computer, a palmtop computer, a mobile Internet device (MID), or a PAD. The structure of the foregoing electronic device is not limited to FIG. 17. For example, the electronic device may further include more or fewer components (for example, a network interface) than those shown in FIG. 17, or has a configuration different from that shown in FIG. 17.

The memory 1702 may be configured to store a software program and module, such as a program instruction/module corresponding to the method and the apparatus for performing the control operation in the embodiments of the present disclosure. The processor 171704 runs the software program and module stored in the memory 1702, to perform various functional applications and data processing, thereby implementing the foregoing method for performing the control operation. The memory 1702 may include a high-speed random memory, and may further include a non-volatile memory, for example, one or more magnetic storage apparatuses, a flash memory, or another nonvolatile solid-state memory. In some embodiments, the memory 1702 may further include memories remotely disposed relative to the processor 1704, and the remote memories may be connected to a terminal through a network. Examples of the network include, but are not limited to, the Internet, an intranet, a local area network, a mobile communication network, and a combination thereof. The memory 1702 specifically may be configured to, but not limited to, store information such as operation information. As an example, as shown in FIG. 17, the memory 1702 may include but is not limited to the acquisition unit 1602, the determining unit 1604 and the execution unit 1606 in the foregoing apparatus for performing the control operation. In addition, the memory may further include but not limited to other module units in the foregoing apparatus for performing the control operation, which will not be elaborated in this example.

In an embodiment, the transmission apparatus 1706 is configured to receive or transmit data by using a network. Specific examples of the foregoing network may include a wired network and a wireless network. In one example, the transmission device 1706 includes a network interface controller (NIC). The NIC may be connected to another network device and a router by using a network cable, so as to communicate with the Internet or a local area network. In one example, the transmission device 1706 is a radio frequency (RF) module, which communicates with the Internet in a wireless manner.

In addition, the foregoing electronic device further includes: A display 1708, configured to display a virtual scene of a virtual character, and a connecting bus 1710, configured to connect various module parts in the foregoing electronic device.

In other embodiments, the terminal device or server may be a node in a distributed system, where the distributed system may be a blockchain system, and the blockchain system may be a distributed system formed by connecting a plurality of nodes through network communication. Nodes form peer to peer (P2P) network may be formed between nodes, any form of device, such as the server, the terminal and other electronic devices, may be added to the P2P network to become one node in the blockchain system.

According to one aspect of this disclosure, a computer program product is provided. The computer program includes a computer-readable instruction. The computer-readable instruction includes a program code for performing the method shown in the flowchart. In such an embodiment, the computer-readable instruction may be downloaded and installed from a network through a communication part, and/or may be installed from a removable medium. When being executed by a central processing unit, the computer-readable Instruction performs various functions provided in the embodiments of this disclosure.

The sequence numbers of the embodiments of the present disclosure are merely for the description purpose but do not imply the preference among the embodiments.

According to one aspect of this disclosure, a computer-readable storage medium is provided. A processor of a computer device reads a computer-readable instruction from the computer-readable storage medium. The processor performs the computer-readable instruction to cause the computer device to perform the foregoing method for performing the control operation.

In this embodiment, the foregoing computer-readable storage medium may be configured to store a computer-readable program used for performing the following steps:

S1: Acquire a touch event, where the touch event carries touch operation information of at least two touch points, and the touch operation information includes respective operation locations of the at least two touch points.

S2: Determine, in a case that the operation locations are matched with a control location of at least one object control in a display interface, a response priority label corresponding to the at least one object control.

S3: According to the response priority label, determine a target control from the at least one object control, and perform a target control operation indicated by the target control.

In this embodiment, a person of ordinary skill in the art may understand that, all or some steps in the methods in the foregoing embodiments may be performed by a program instructing related hardware of a terminal device. The program may be stored in a computer-readable storage medium. The storage medium may include: a flash drive, a Read-Only Memory (ROM), a Random Access Memory (RAM), a magnetic disk, an optical disc, and the like.

In a case that the integrated unit in the foregoing embodiments is implemented in a form of a software functional unit and sold or used as an independent product, the integrated unit may be stored in the foregoing computer-readable storage medium. Based on such an understanding, the technical solutions of the present disclosure essentially, or the part contributing to the prior art, or all or some of the technical solutions may be presented in the form of a software product. The computer software product is stored in the storage medium, and includes several instructions for instructing one or more computer devices (which may be a personal computer, a server, a network device, or the like) to perform all or some of the steps of the methods described in the embodiments of the present disclosure.

In the foregoing embodiments of the present disclosure, the descriptions of the embodiments have different focuses. For a part that is not detailed in an embodiment, reference may be made to the relevant description of other embodiments.

In the several embodiments provided in this disclosure, it is to be understood that, the disclosed client may be implemented in another manner. The described apparatus embodiment is merely exemplary. For example, the unit division is merely logical function division and may be other division in actual implementation. For example, multiple units or components may be combined or integrated into another system, or some features may be ignored or not performed. In addition, the coupling, or direct coupling, or communication connection between the displayed or discussed components may be the indirect coupling or communication connection through some interfaces, units, or modules, and may be electrical or of other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a software functional unit.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory).

Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A method for performing a control operation, the method comprising:

acquiring, by processing circuitry, touch operation information of at least two touch points of a touch event, the touch operation information comprising respective locations of the at least two touch points;

in response to a determination that at least two of the locations of the at least two touch points are matched with respective locations of one or more object controls in a display interface, determining, by the processing circuitry, respective response priority labels corresponding to each of the one or more object controls; and selecting, by the processing circuitry, one object control with a highest response priority among response priorities indicated by the response priority labels as a target control from among the one or more object controls, and performing a target control operation indicated by the target control, wherein the locations of the one or more object controls in the display interface are fixed.

2. The method according to claim 1, wherein the selecting the one object control comprises:

sorting the one or more object controls according to the respective response priority labels to obtain a sorting result; and when the sorting result indicates the one object control with the highest response priority, selecting the one object control with the highest response priority as the target control.

3. The method according to claim 2, further comprising:

when the sorting result indicates that two or more object controls have the highest response priority, determining respective control operation times of each the two or more object controls having the highest response priority; and selecting the one object control with an earliest control operation time among the two or more object controls having the highest response priority as the target control.

4. The method according to claim 1, wherein the respective locations of the at least two touch points are matched with a location of the one object control in the display interface that is selected as the target control; and the performing the target control operation includes:

determining a respective touch time of each of the at least two touch points on the target control;

determining an operation triggered by a touch point with an earliest touch time as the target control operation to be performed; and performing the target control operation.

5. The method according to claim 1, further comprising:

in response to a determination that a number of the at least two touch points has changed, acquiring respective updated response priority labels corresponding to each of one or more object controls of an updated number of the at least two touch points after the change;

according to the respective updated response priority labels, sorting the one or more object controls of the updated number of the at least two touch points after the change to obtain an updated sorting result; and determining the target control operation to be performed according to the updated sorting result.

6. The method according to claim 1, wherein the touch event comprises at least one of a click operation event, a long-press operation event, a drag operation event, or a double-click operation event.

7. The method according to claim 1, wherein the response priority labels corresponding to each of the one or more object controls are pre-configured according to the display interface.

8. The method according to claim 1, wherein the determining the respective response priority labels comprises:

acquiring response region information of each object control in the display interface;

sequentially comparing a respective location of each touch point indicated by the touch operation information with the response region information of each object control to obtain a comparison result;

when the comparison result indicates that a location of a touch point is located in a response region of an object control, determining that the location of the touch point is matched with a location of the object control, and acquiring a response priority label of the matched object control; and saving the response priority label of the matched object control into a management container.

9. The method according to claim 8, wherein the selecting the target control further comprises:

reading the response priority label of the matched object control from the management container.

10. The method according to claim 9, further comprising:

removing the response priority label of the matched object control from the management container after the target control operation is performed.

11. The method according to claim 8, further comprising:

assigning a respective response priority label for each object control in the display interface;

acquiring the response region information of each object control, the response region information indicating a control response region of the respective object control in the display interface; and encapsulating the respective response priority label and respective response region information of each object control in the display interface, and saving the encapsulated response priority label and response region information of each object control in the management container.

12. The method according to claim 8, wherein the touch event comprises an event triggered by a screen-sliding operation;

the management container comprises a screen-sliding manager; and the method further comprises:

adding a plurality of controls corresponding to the screen-sliding operation to the screen-sliding manager, assigning each of the plurality of controls corresponding to the screen-sliding operation to respective response priority labels, and encapsulating and saving screen-sliding data of the screen-sliding operation.

13. The method according to claim 12, wherein the screen-sliding data comprises a control location, a control size, and a respective response priority label; and the encapsulating and saving the screen-sliding data comprises:

encapsulating the control location, the control size, and the respective response priority label, and saving a result obtained by the encapsulating into a data management container of the screen-sliding manager.

14. A method for performing a control operation, the method comprising:

displaying, by processing circuitry, a display interface comprising two or more object controls responsive to a touch input, each object control being arranged at a corresponding control location in the display interface; and in response to a determination that at least two touch points in the display interface trigger a touch event and respective locations of the at least two touch points are matched with a control location of one or more object controls in the display interface, performing, by the processing circuitry, a target control operation that is indicated by a target control corresponding to one of the one or more object controls matched to the locations of the at least two touch points, wherein the target control is one of the one or more object controls matched to the locations of the at least two touch points and corresponds to a highest response priority among response priorities indicated by response priority labels corresponding to each of the one or more object controls, and the locations of the one or more object controls in the display interface are fixed.

15. The method according to claim 14, wherein the touch event comprises a screen-sliding operation; and the target control operation comprises a viewing angle steering operation.

16. An apparatus for performing a control operation, comprising:

processing circuitry configured to acquire touch operation information of at least two touch points of a touch event, the touch operation information comprising respective locations of the at least two touch points, in response to a determination that at least two of the locations are matched with respective locations of one or more object controls in a display interface, determine respective response priority labels corresponding to each of the one or more object controls; and select one object control with a highest response priority among response priorities indicated by the response priority labels as a target control from among the one or more object controls, and perform a target control operation indicated by the target control, wherein the locations of the one or more object controls in the display interface are fixed.

17. The apparatus according to claim 16, wherein the processing circuitry is further configured to:

sort the one or more object controls according to the respective response priority labels to obtain a sorting result; and when the sorting result indicates the one object control with the highest response priority, select the one object control with the highest response priority as the target control, and perform the target control operation indicated by the target control.

18. The apparatus according to claim 17, wherein the processing circuitry is further configured to:

when the sorting result indicates that two or more object controls have the highest response priority, determine respective control operation times of each the two or more object controls having the highest response priority; and select the one object control with an earliest control operation time among the two or more object controls having the highest response priority as the target control, and perform the target control operation indicated by the target control.

19. The apparatus according to claim 16, wherein the respective locations of the at least two touch points are matched with a location of the one object control in the display interface; and the processing circuitry is further configured to:

determine respective touch time of each of the at least two touch points on the target control;

determine an operation triggered by a touch point with an earliest touch time as the target control operation to be performed; and perform the target control operation.

20. The apparatus according to claim 16, wherein the processing circuitry is further configured to:

in response to a determination that a number of the at least two touch points has changed, acquire respective updated response priority labels corresponding to each of one or more object controls of an updated number of the at least two touch points after the change;

according to the respective updated response priority labels, sort the one or more object controls of the updated number of the at least two touch points after the change to obtain an updated sorting result; and determine the target control operation to be performed according to the updated sorting result.

* * * * *